July 1, 1952  M. SMITH  2,601,890
MEANS FOR MAINTAINING TENSION IN SEAT COVERS
Filed Oct. 21, 1950
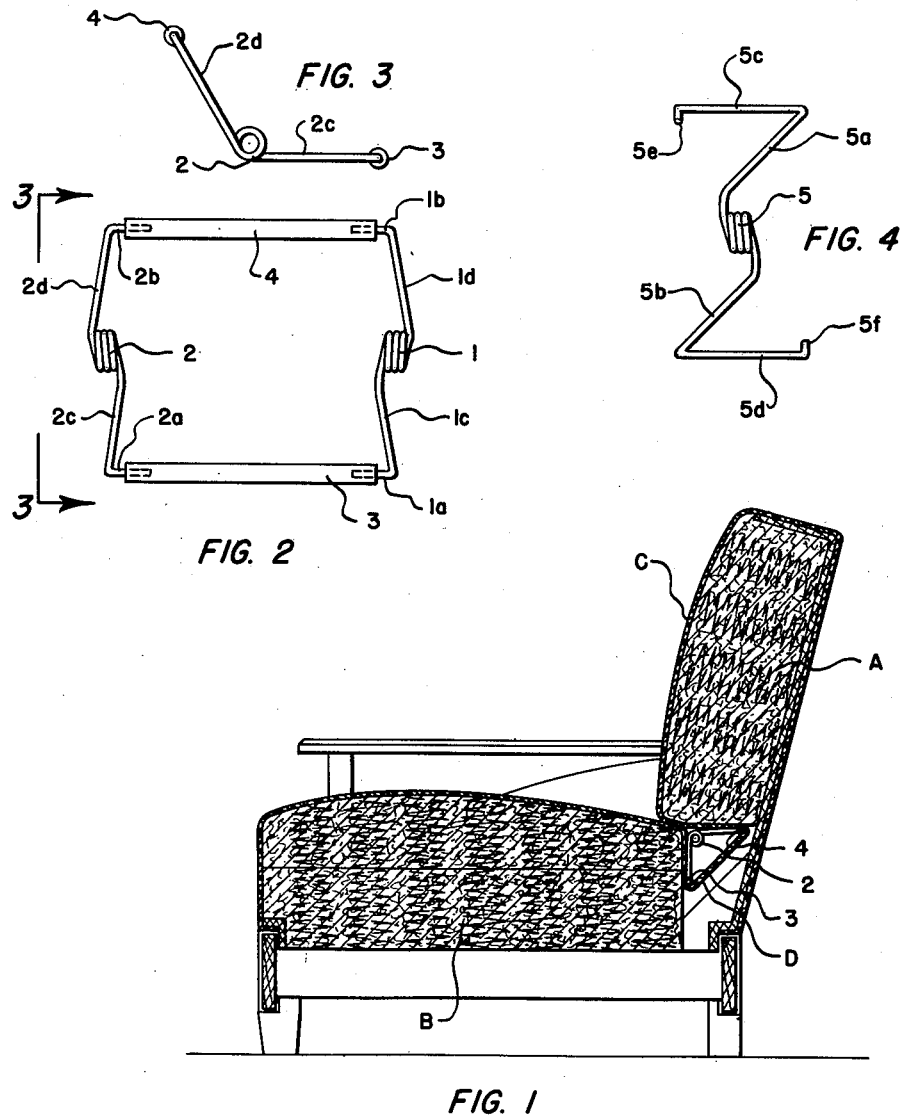
INVENTOR.
MINA SMITH
BY
Wm. H. Dean
AGENT Patented July 1, 1952

2,601,890

UNITED STATES PATENT OFFICE 2,601,890

MEANS FOR MAINTAINING TENSION IN SEAT COVERS

Mina Smith, Eugene, Oreg.

Application October 21, 1950, Serial No. 191,383

4 Claims. (Cl. 155—182)

My invention relates to a means for maintaining tension in seat covers, and more particularly for use in connection with seat covers applied to upholstered furniture or the like, and the objects of my invention are:

First, to provide a means of this class which may be readily and easily inserted between the seat back and seat cushion within a continuous cover therefor, whereby the resilient character of the means completely takes up all slack material in said cover maintaining the same in tight and smooth condition throughout the seat back and seat cushion surfaces;

Second, to provide a means of this class which is readily yieldable, permitting the same to be held in collapsed condition during placement thereof intermediate seat backs and seat cushions without the use of tools;

Third, to provide a means of this class which may be made of a single piece of resilient wire, if desired;

Fourth, to provide a means of this class which may be installed intermediate seat cushions and seat backs within the seat cover thereover at desired spaced positions, whereby covers on seats of various shapes and sizes may readily be accommodated;

Fifth, to provide a means of this class which is resilient and which yields to the tension created in seat covers when a person sits thereon, whereby undue strain is not imposed upon the seat covers by said means when the cover engaged thereby is under tension;

Sixth, to provide a means of this class which maintains sufficient tension on seat covers at all times in order to hold them neat and smooth; and Seventh, to provide a means of this class which is very simple and economical of construction, efficient in operation, and which will not readily deteriorate or get out of order.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon, forming a part of this application, in which:

Fig. 1 is a vertical sectional view of an upholstered seat showing a continuous cover on the seat cushion and seat back, and illustrating my means for maintaining tension in seat covers in engagement with said seat cover intermediate the cushion and seat back; Fig. 2 is an enlarged side elevational view of the means shown in Fig. 1 of the drawings; Fig. 3 is an end view thereof, taken from the line 3—3 of Fig. 2; and Fig. 4 is a side elevational view of the modified form of said means, showing similar disposition thereof to the structure shown in Fig. 2 of the drawings.

Similar characters of reference refer to similar parts and portions throughout the several views of the drawings.

My means for maintaining tension in seat covers, as shown in Fig. 2 of the drawings, is provided with a pair of resilient coil springs 1 and 2, having opposed arms engaging the bars 3 and 4. Opposite ends 1a and 1b of the coil spring 1 extend into the bars 3 and 4, respectively, and opposite ends 2a and 2b extend into the ends of said bars 3 and 4 in opposed relationship to the ends 1a and 1b of the coil spring 1. As shown in Fig. 3 of the drawings, the arm portions 2c and 2d of the coil spring 2 are disposed in obtuse angular relationship to each other, normally maintaining the bars 3 and 4 widely separated. It will be noted that each of the coil springs 1 and 2 is provided with several convolutions of resilient wire, with which the arms 1c and 1d, and 2c and 2d, respectively, are integral.

The operation of my means for maintaining tension in seat covers is substantially as follows:

The bars 3 and 4 are forced into adjacent relationship to each other against tension of the coil springs 1 and 2, and are inserted between the seat back A and the seat cushion B, within the cover C, and the bars 3 and 4 are released, permitting the coil springs 1 and 2 to force them apart in engagement with the cover C, creating a tension therein over the surfaces of the seat back A and seat cushion B. It will be noted that the seat cover C is a continuous cover, which extends over the seat back A and the seat cushion B, and is provided with a slack portion D, which is tucked in between the seat back A and the seat cushion B, in which my means for maintaining tension in seat covers is positioned.

In the modification, as shown in Fig. 4 of the drawings, I have provided a single coil spring 5, having opposed offset arms 5a and 5b, provided with parallel bar portions 5c and 5d, respectively, which are substantially equivalent to the bars 3 and 4 of the structure disclosed in Figs. 2 and 3 of the drawings. These bar portions 5c and 5d are provided with inwardly directed end portions 5e and 5f, which are arranged to be directed away from the material engaged thereby in the tucked-in portion D hereinbefore described. The angular relationship of the arms 5a and 5b of the structure shown in Fig. 4 of the drawings is similar to the angular relationship of the arms 2c and 2d, shown in Fig 3 of the drawings, and the installation of the modified structure shown in Fig. 4 is similar to that shown in Fig. 1 of the drawings.

It will be noted that I have provided a one-piece slip cover having means for creating tension therein, so that a variety of shapes and sizes of furniture may be accommodated by my means for maintaining tension in seat covers.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a means for maintaining tension in seat covers, the combination with a seat cushion and a seat back of a continuous cover having a portion thereof tucked between said seat cushion and said seat back, and resilient means within said tucked-in portion intermediate said seat cushion and said seat back, tending to expand in said tucked-in portion and create tension over the surfaces of said seat cushion and said seat back, said resilient means having coil spring portions and arm portions connected therewith diverging in obtuse angular relationship to each other.

2. In a means for maintaining tension in seat covers, the combination with a seat cushion and a seat back of a continuous cover having a portion thereof tucked between said seat cushion and said seat back, and resilient means within said tucked-in portion intermediate said seat cushion and said seat back, tending to expand in said tucked-in portion and create tension over the surfaces of said seat cushion and said seat back, said resilient means having coil spring portions and arm portions connected therewith diverging in obtuse angular relationship to each other, bars of said arms extending in substantially parallel relationship to each other adapted to be forced together against tension of said coil spring.

3. In a means for maintaining tension in seat covers, a coil spring having opposed arm portions in obtuse diverging relationship to each other, provided with integral parallel bars.

4. In a means for maintaining tension in seat covers, a pair of coil springs having opposed angularly directed arms and bars parallel to each other, engaged with the ends of said arms of said springs.

MINA SMITH.

REFERENCES CITED

The following references are of record in the file of this patent:

FOREIGN PATENTS

| Number | Country | Date |
|---|---|---|
| 303,282 | Great Britain | June 3, 1929 |